(12) United States Patent
DeLuca et al.

(10) Patent No.: US 10,832,293 B2
(45) Date of Patent: Nov. 10, 2020

(54) CAPTURING SENSOR INFORMATION FOR PRODUCT REVIEW NORMALIZATION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/708,742

(22) Filed: Sep. 19, 2017

(65) Prior Publication Data

US 2019/0087874 A1    Mar. 21, 2019

(51) Int. Cl.
   *G06Q 30/02*     (2012.01)
   *G06F 16/9535*   (2019.01)

(52) U.S. Cl.
   CPC ..... *G06Q 30/0282* (2013.01); *G06F 16/9535* (2019.01)

(58) Field of Classification Search
   None
   See application file for complete search history.

(56) References Cited

U.S. PATENT DOCUMENTS

| | | |
|---|---|---|
| 7,899,875 B1 | 3/2011 | Gall |
| 8,615,474 B2 | 12/2013 | Avedissian et al. |
| 8,799,106 B2 | 8/2014 | Bartel |
| 9,471,588 B1 | 10/2016 | Saraya |
| 9,489,686 B2 | 11/2016 | Lee et al. |
| 9,607,325 B1* | 3/2017 | Sriram ............... G06Q 30/0282 |
| 2005/0034071 A1 | 2/2005 | Musgrove et al. |
| 2007/0112760 A1 | 5/2007 | Chea et al. |

(Continued)

FOREIGN PATENT DOCUMENTS

| | | |
|---|---|---|
| EP | 2254088 | 11/2010 |
| WO | 2010120840 | 10/2010 |
| WO | 2013049529 | 4/2013 |

OTHER PUBLICATIONS

Sajid, Anam et al.; Cloud-Assisted IoT-Based SCADA Systems Security: A Review of the State of the Art and Future Challenges; IEEE Access—Special Section on the Plethora of Research in Internet of Things (IoT); vol. 4, 2016; Mar. 31, 2016; pp. 1375-1384.

(Continued)

*Primary Examiner* — Andrew B Whitaker
(74) *Attorney, Agent, or Firm* — Schmeiser, Olsen & Watts; Stephanie Carusillo

(57) ABSTRACT

An approach is provided for normalizing reviews. A user's request is received for a view of reviews of a first product. An identity of the user is determined. Based on the identity, data is retrieved specifying a behavior of the user which describes usage by the user of a second product. Based on the data specifying the behavior of the user, topics are identified which specify (i) a behavior of reviewer(s), where the behavior is directed to the first product and matches the behavior of the user specified by the retrieved data or (ii) an aspect of the first product which matches an aspect of the second product to which the behavior of the user is directed. The reviews are normalized based on the identified topics.

8 Claims, 7 Drawing Sheets

(56) References Cited

U.S. PATENT DOCUMENTS

| | | |
|---|---|---|
| 2009/0063247 A1 | 3/2009 | Burgess et al. |
| 2010/0145647 A1 | 6/2010 | Bouchard |
| 2011/0004508 A1 | 1/2011 | Huang et al. |
| 2011/0202400 A1* | 8/2011 | Bedard ............... G06Q 30/0251 705/14.19 |
| 2013/0275267 A1* | 10/2013 | Cvek ................. G06Q 30/0623 705/26.61 |
| 2014/0172638 A1* | 6/2014 | El-Hmayssi ....... G06Q 30/0631 705/26.41 |
| 2014/0236858 A1 | 8/2014 | Abel et al. |
| 2015/0032650 A1 | 1/2015 | Mermelstein |
| 2015/0066711 A1 | 3/2015 | Chua et al. |
| 2015/0073907 A1* | 3/2015 | Purves ................ G06Q 20/384 705/14.58 |
| 2015/0213521 A1 | 7/2015 | Sivashanmugam et al. |
| 2015/0242891 A1* | 8/2015 | Mimran ............. G06Q 30/0255 705/14.53 |
| 2015/0278826 A1 | 10/2015 | Arafat et al. |
| 2015/0332353 A1 | 11/2015 | Chauhan |
| 2016/0148297 A1* | 5/2016 | Kashyap ............ G06Q 30/0631 705/26.7 |
| 2016/0196566 A1 | 7/2016 | Murali et al. |
| 2016/0253738 A1* | 9/2016 | Pinckney ................. G06N 5/04 705/26.7 |
| 2016/0292768 A1 | 10/2016 | Needham |
| 2016/0328483 A1* | 11/2016 | Mukherjee ............ G06F 16/958 |
| 2016/0335701 A1 | 11/2016 | Allen et al. |
| 2018/0012283 A1* | 1/2018 | Harve ................ G06Q 30/0631 |
| 2018/0047074 A1* | 2/2018 | Cronin ................... G06Q 10/00 |

OTHER PUBLICATIONS

Syta, James M.; List of IBM Patents or Patent Applications Treated as Related; Sep. 19, 2017; 1 page.

Logan, Beth et al.; Sensors to detect the activities of daily living; 28th Annual International Conference of the IEE Engineering Medicine and Biology Society; Aug. 30-Sep. 3, 2006; 1 page. (Abstract).

Leopold, George; Is the IoT Really "Internet of Sensors"?; EnterpriseTech URL: https://www.enterprisetech.com/2015/05/08/is-the-iot-really-internet-of-sensors/; May 8, 2015; 5 pages.

Michalowicz, Michael; How to Get Countless Amazon Verfiews (and Rabid Fans!); URL: http://www.mikemichalowicz.com/how-to-get-countless-amazon-verified-reviews-and-rabid-fans/; Dec. 14, 2014; 12 pages.

Yang, Che-Chang et al.; Remote monitoring and assessment of daily activities in the home environment; Journal of clinical Gerontology & Geriatrics; Jun. 3, 2012; pp. 97-104.

Abrahams, Alan S., et al. "An Integrated Text Analytic Framework for Product Defect Discovery." Production and Dperations Management 24.6 (2015): 975-990 (Year: 2015).

\* cited by examiner

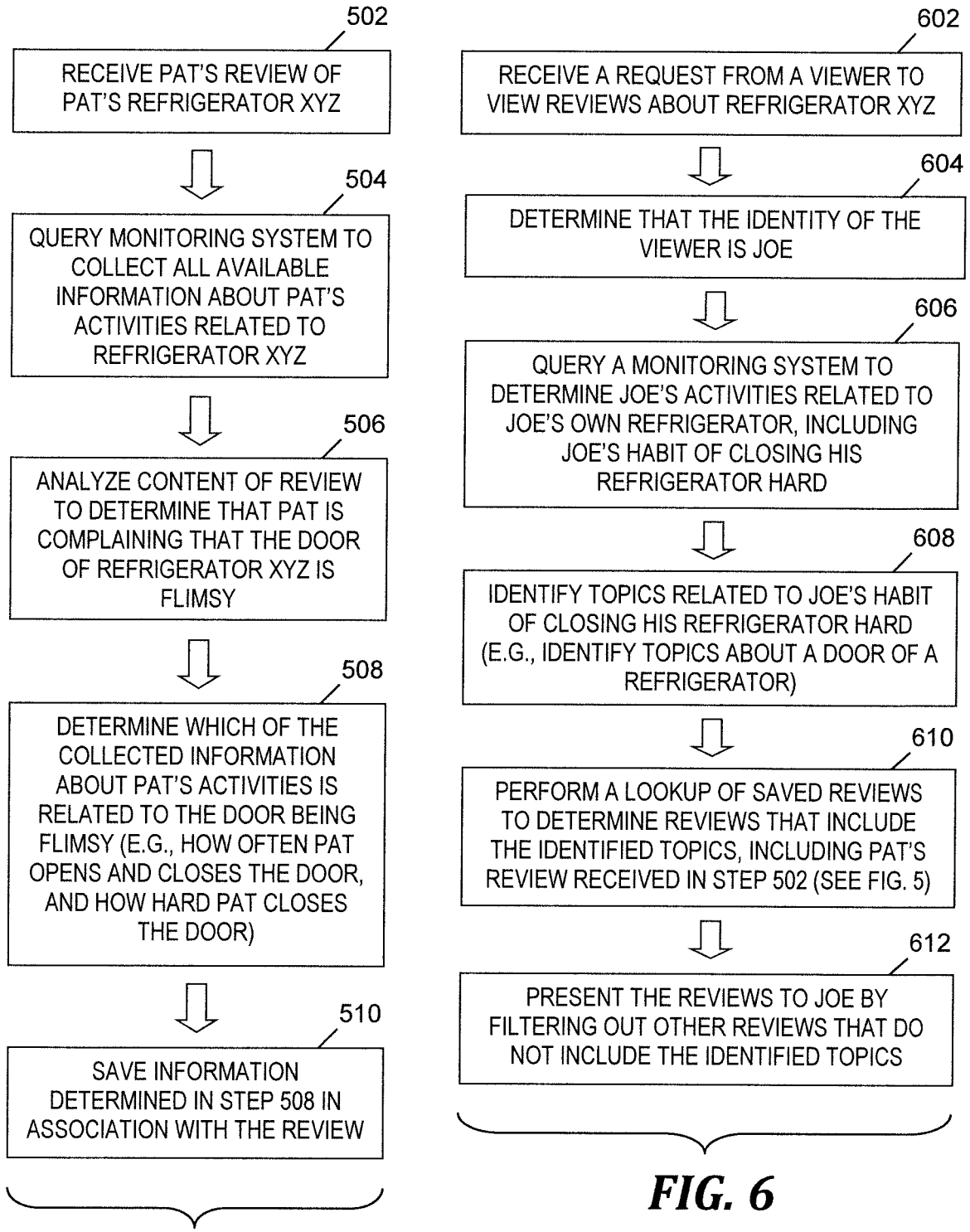

700

★★★★☆  I can't live without my Fitness Tracker XYZ

■ *verified user* } 704
■ *verified purchase* by Chris Smith                                on July 26, 2017

I really like my Fitness Tracker XYZ. I use it every day to track the
number of steps I go. My favorite feature is the ability to challenge } 702
my coworkers, it motivated me to move more.

■ *Chris records an average of 10,000 steps a day.* } 706

FIG. 7

CAPTURING SENSOR INFORMATION FOR PRODUCT REVIEW NORMALIZATION

BACKGROUND

The present invention relates to managing captured sensor information, and more particularly to managing captured sensor information from connected Internet of Things devices.

In determining whether or not to purchase a product, consumers rely on reviews of the product. Many online retailers allow reviews to be a factor in refining search results for products, such as by limiting product search results based on ratings of the products, where the ratings are provided by users of an online retailer's website. For example a customer review section of a retailer's website may include user ratings, where each rating is at a level of one, two, three, four, or five stars, and a review section includes percentages of reviews for each of the "star" levels. In known product review systems, each review is independent and affects the overall rating for a product regardless of how an individual reviewer tends to rate other products.

Known monitoring systems include smart home sensor technology using the Internet of Things (IoT) devices. The monitoring systems may include known embedded and worn sensors that detect and monitor activities of daily life (ADL) (e.g., cooking, eating, personal hygiene, a person's mobility, and a person's usage of appliances and other items in the home, etc.). Data from ADL sensors indicate a person's well-being and can be the "eyes and ears" of home caregivers. Known machine learning algorithms discover and model human activity using event pattern discovery, identify variability in event patterns and respond accordingly with alert notification or recommendations for new rules, and recognize concurrent and interleaved human activities.

Many connected devices offer a set of application programming interfaces (APIs) by which developers access valuable data provided by the devices. This access to the valuable data provides an opportunity for third parties to utilize the data from the connected devices to improve their products.

SUMMARY

In one embodiment, the present invention provides a method of normalizing reviews. The method includes a computer receiving a request from a user for a view of reviews of a first product. The reviews are provided by respective reviewers. The method further includes the computer determining an identity of the user. The method further includes based on the identity, the computer retrieving data specifying a behavior of the user. The behavior describes a usage by the user of a second product. The method further includes based on the data specifying the behavior of the user, the computer identifying topics (i) specifying a behavior of one or more of the reviewers that is directed to the first product and matches the behavior of the user or (ii) specifying an aspect of the first product which matches an aspect of the second product to which the behavior of the user is directed. The method further includes based on the identified topics, the computer normalizing the reviews of the first product.

In another embodiment, the present invention provides a computer program product including a computer readable storage medium and computer readable program code stored in the computer readable storage medium. The computer readable program code contains instructions that are executed by a central processing unit (CPU) of a computer system to implement a method of normalizing reviews. The method includes the computer system receiving a request from a user for a view of reviews of a first product. The reviews are provided by respective reviewers. The method further includes the computer system determining an identity of the user. The method further includes based on the identity, the computer system retrieving data specifying a behavior of the user. The behavior describes a usage by the user of a second product. The method further includes based on the data specifying the behavior of the user, the computer system identifying topics (i) specifying a behavior of one or more of the reviewers that is directed to the first product and matches the behavior of the user or (ii) specifying an aspect of the first product which matches an aspect of the second product to which the behavior of the user is directed. The method further includes based on the identified topics, the computer system normalizing the reviews of the first product.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of normalizing reviews. The method includes the computer system receiving a request from a user for a view of reviews of a first product. The reviews are provided by respective reviewers. The method further includes the computer system determining an identity of the user. The method further includes based on the identity, the computer system retrieving data specifying a behavior of the user. The behavior describes a usage by the user of a second product. The method further includes based on the data specifying the behavior of the user, the computer system identifying topics (i) specifying a behavior of one or more of the reviewers that is directed to the first product and matches the behavior of the user or (ii) specifying an aspect of the first product which matches an aspect of the second product to which the behavior of the user is directed. The method further includes based on the identified topics, the computer system normalizing the reviews of the first product.

Embodiments of the present invention provide reviews of a product provided by reviewers, where a presentation of the reviews is normalized for a user so that the presentation includes only reviews that include topics that are related to the behaviors of the user or the expected usage of the product by the user.

BRIEF DESCRIPTION OF THE DRAWINGS

FIG. 5 is an example of saving reviewer activity information in association with a review created by the process of FIG. 3, in accordance with embodiments of the present invention.

FIG. 6 is an example of normalizing reviews using the process of FIG. 2, in accordance with embodiments of the present invention.

FIG. 7 is an example of a review modified by the process of FIG. 4, in accordance with embodiments of the present invention.

DETAILED DESCRIPTION

Overview

Embodiments of the present invention normalize reviews of a product based on a history of usage of the product by the reviewers who provided the reviews and based on behaviors of the user who is requesting to view the reviews. In one embodiment, a user who is viewing reviews of a product that the user already owns views a comparison of usage of the product by the reviewers with usage of the product by the user, or reviewers' behaviors associated with the product with the user's behaviors associated with the product.

Embodiments of the present invention present connected device data associated with reviews of products that include or are otherwise associated with the connected device. The presentation of the connected device data associated with the reviews verifies the usage of the product by the reviewer or the usage of a particular aspect of the product by the reviewer.

System for Normalizing Reviews

Figure 1:
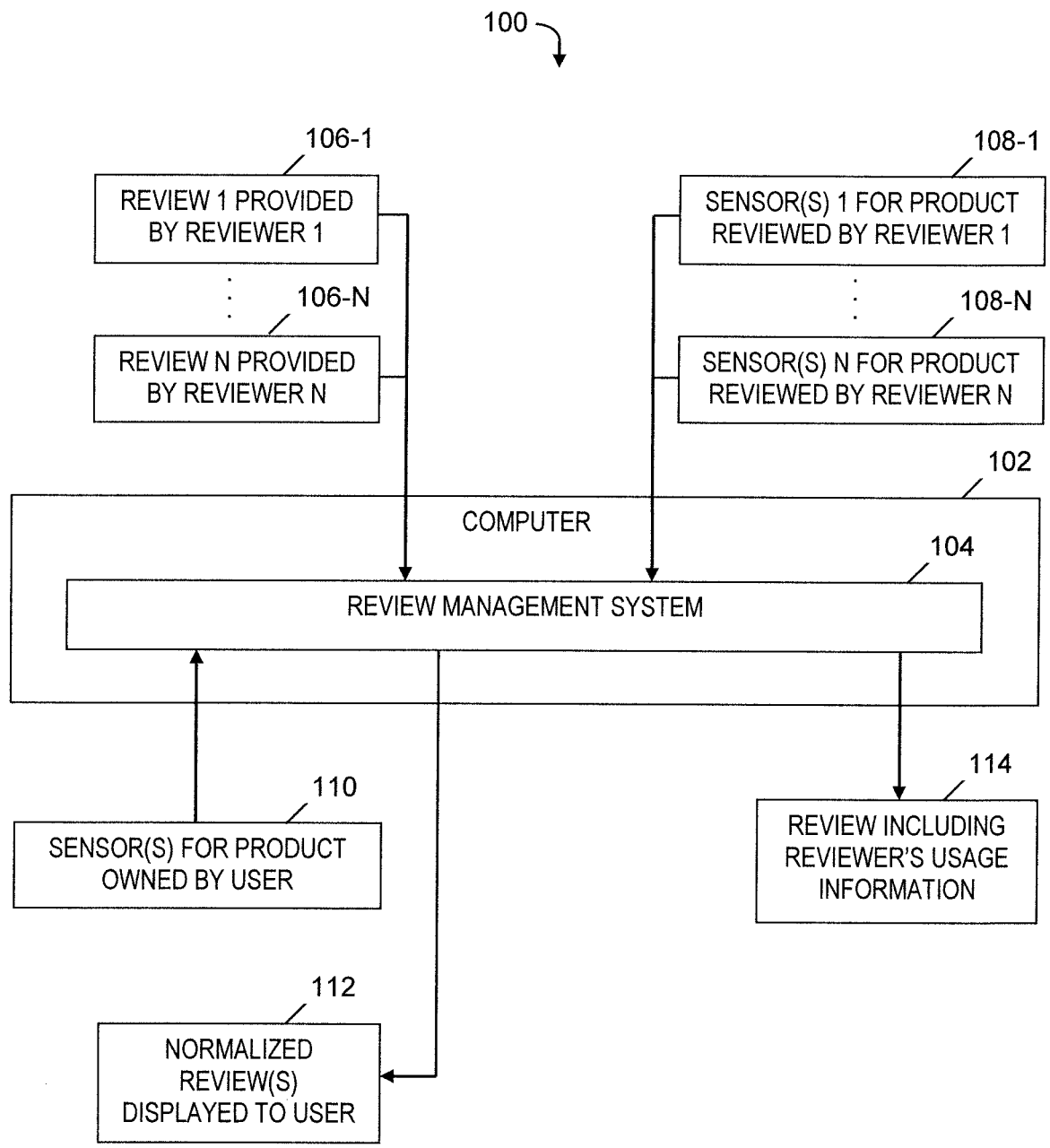
FIG. 1 is a block diagram of a system for normalizing reviews, in accordance with embodiments of the present invention.

FIG. 1 is a block diagram of a system 100 for normalizing reviews, in accordance with embodiments of the present invention. System 100 includes a computer 102, which executes a software-based review management system 104, which receives review 106-1, . . . , review 106-N, which are reviews of a product, where N is an integer greater than or equal to one. In one embodiment, reviews 106-1, . . . , 106-N are provided by respective human reviewers via computer systems (not shown) coupled to computer 102. Sensor(s) 108-1, . . . , sensor(s) 108-N are operatively coupled to computer 102 via computer network(s) (not shown). Sensor(s) 108-1, . . . , sensor(s) 108-N monitor and collect information about usage of the reviewed product by reviewer 1, . . . , reviewer N respectively, and/or information about behavior or activity of reviewer 1, . . . , reviewer N, respectively, where the behavior or activity is associated with the reviewed product as a whole or an aspect of the product. Sensor(s) 108-1, . . . , sensor(s) 108-N send the monitored and collected information to review management system 104. In one embodiment, sensor(s) 108-1, . . . , sensor(s) 108-N are included in connected devices that are included in an Activities of Daily Life (ADL) monitoring system.

Review management system 104 determines which behavior or activity or usage information collected by sensor(s) 108-1, . . . , 108-N is most closely related to the content of review 106-1, . . . , 106-N, respectively. In one embodiment, review management system 104 uses text analysis to determine a confidence level indicating whether text in the behavior, activity, or usage information is related to text in the content of a corresponding review. In one embodiment, review management system 104 saves in a data repository (not shown) the aforementioned behavior, activity or usage information in association with the corresponding review.

Review management system 104 receives information about behavior, activity, or usage of a product owned by a user who is requesting a view of one or more of reviews 106-1, . . . , 106-N of a product of the same type as the product owned by the user, where the information is received from sensor(s) 110. Review management system 104 identifies topics that are related to the user's usage of the product owned by the user and determines normalized review(s) 112 included in reviews 106-1, . . . , 106-N by filtering out review(s) from reviews 106-1, . . . , 106-N whose content does not include the identified topics. Review management system 104 displays or otherwise presents the normalized review(s) 112 to the user.

In one embodiment, review management system 104 receives review 106-1, which is a review of a product that is a connected device or includes a connected device, where the review was provided by reviewer 1. Review management system 104 calls available API(s) for the connected device to obtain data from the connected device, where the data specifies usage of the product by reviewer 1 or usage of an aspect of the product by reviewer 1. Review management system 104 modifies review 106-1, which results in a review 114, which includes information about the actual usage of the product by reviewer 1. Review management system 104 presents review 114 to a second user, so that the actual usage of the product by reviewer 1 is verified to the second user.

The functionality of the components shown in FIG. 1 is described in more detail in the discussion of FIG. 2, FIG. 3, FIG. 4, and FIG. 8 presented below.

Process for Normalizing Reviews

Figure 2:
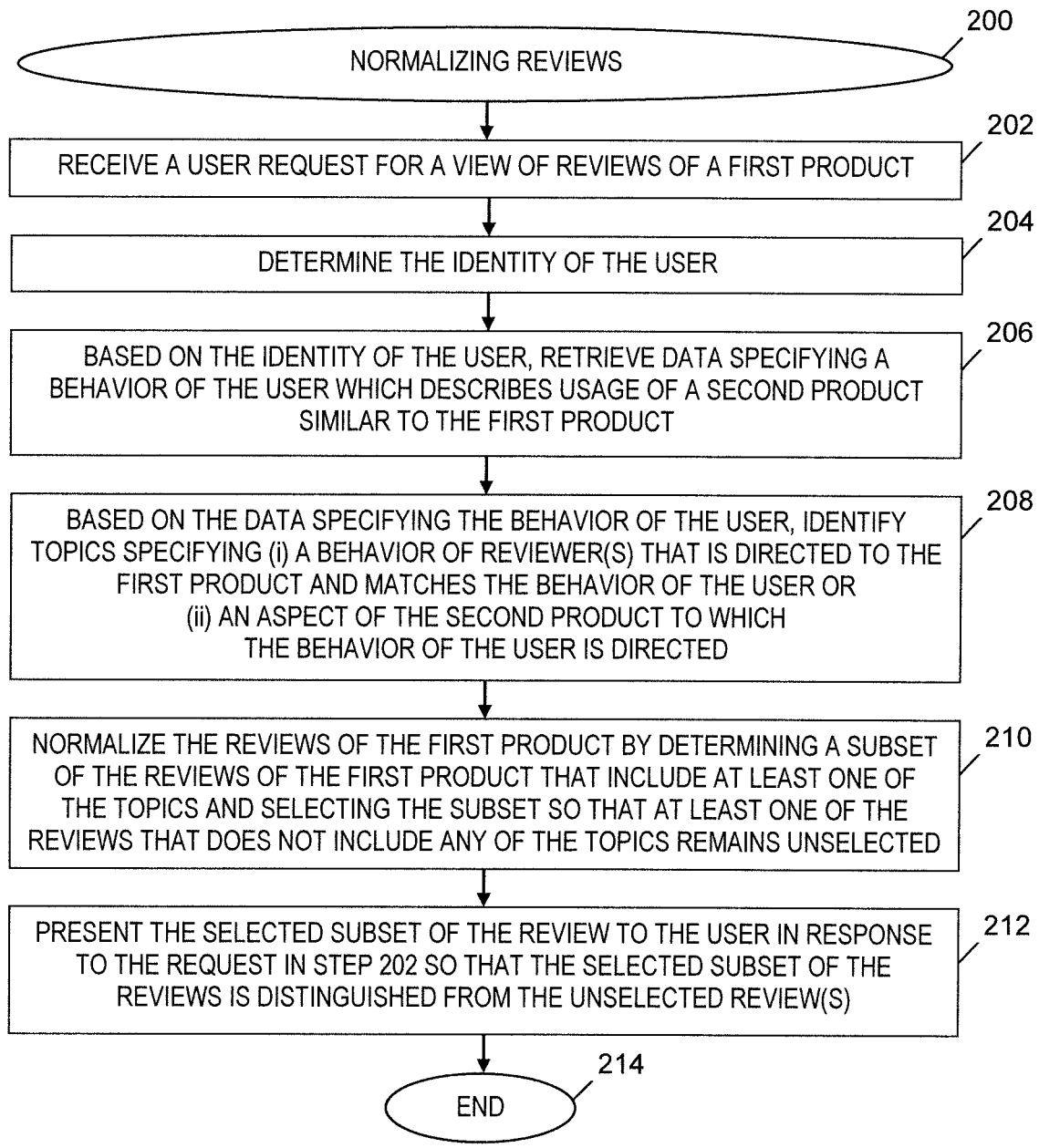
FIG. 2 is a flowchart of a process of normalizing reviews, where the process is implemented by the system of FIG. 1, in accordance with embodiments of the present invention.

FIG. 2 is a flowchart of a process of normalizing reviews, where the process is implemented by the system of FIG. 1, in accordance with embodiments of the present invention. The process of FIG. 2 begins at step 200. In step 202, review management system 104 (see FIG. 1) receives a request from a user for a view of one or more reviews of a first product, where the review(s) are included in reviews 106-1, . . . , 106-N (see FIG. 1).

In step 204, review management system 104 (see FIG. 1) determines the identity of the user who made the request received in step 202.

In step 206, based on the identity of the user determined in step 204, review management system 104 (see FIG. 1) retrieves data specifying a behavior or activity of the user which describes usage of a second product or of an aspect of a second product. In one embodiment, the second product is similar to the first product. As used herein, the first and second products being similar means that the products are of the same product type or have the same overall functionality, but differ in their manufacturer and/or model number. For example, the first product may be similar to the second product if both the first and second products are refrigerators, but the first product is manufactured by Company A and the second product is manufactured by Company B (or the first and second products are manufactured by Company C, and the first product is Model XYZ and the second product is Model DEF). In one embodiment, the first and second products have the same manufacturer, but the second product is an update, a previous version of, or another variation of the first product. In another embodiment, the first and second products have the same manufacturer and are the same model.

In step 208, based on the data retrieved in step 206 which specifies the behavior or activity of the user, review management system 104 (see FIG. 1) identifies topics specifying (i) a behavior of reviewer(s) that is directed to the first product and matches the behavior or activity specified by the data retrieved in step 206 and/or (ii) an aspect of the second product to which the behavior or activity of the user is directed.

In step 210, review management system 104 (see FIG. 1) normalizes reviews 106-1, . . . , 106-N (see FIG. 1) by determining a subset of reviews 106-1, . . . , 106-N (see FIG. 1) of the first product that include at least one of the topics identified in step 208 and selecting the subset so that at least one of the reviews 106-1, . . . , 106-N which does not include any of the topics identified in step 208 remains unselected. Determining the above-mentioned subset includes filtering out or lowering the priority of the review(s) included in reviews 106-1, . . . , 106-N that do not include any of the topics identified in step 208.

In step 212, review management system 104 (see FIG. 1) presents the subset of reviews determined in step 210 to the user in response to the request received in step 202, so that the selected subset of the reviews 106-1, . . . , 106-N (see FIG. 1) is distinguished from the unselected review(s). In one embodiment, presenting the subset of reviews to be distinguished from the unselected review(s) includes presenting the review(s) in the subset in a prioritized position in a list of reviews resulting from the request in step 202 (e.g., the review(s) in the subset are presented above the unselected review(s)). In another embodiment, review management system 104 (see FIG. 1) presents the subset of reviews to the user, but does not present the unselected review(s) to the user. In another embodiment, review management system 104 (see FIG. 1) presents the unselected review(s), but include a visual indicator that indicates that the unselected review(s) are not related to the topics identified in step 208. In another embodiment, review management system 104 (see FIG. 1) presents to the user each review in the subset of reviews together with a visual indicator that indicates that the review is relevant to the user based on behavior, activity, or usage of the reviewer matching a behavior, activity, or usage of the user.

In step 214, the process of FIG. 2 ends.

Figure 3:
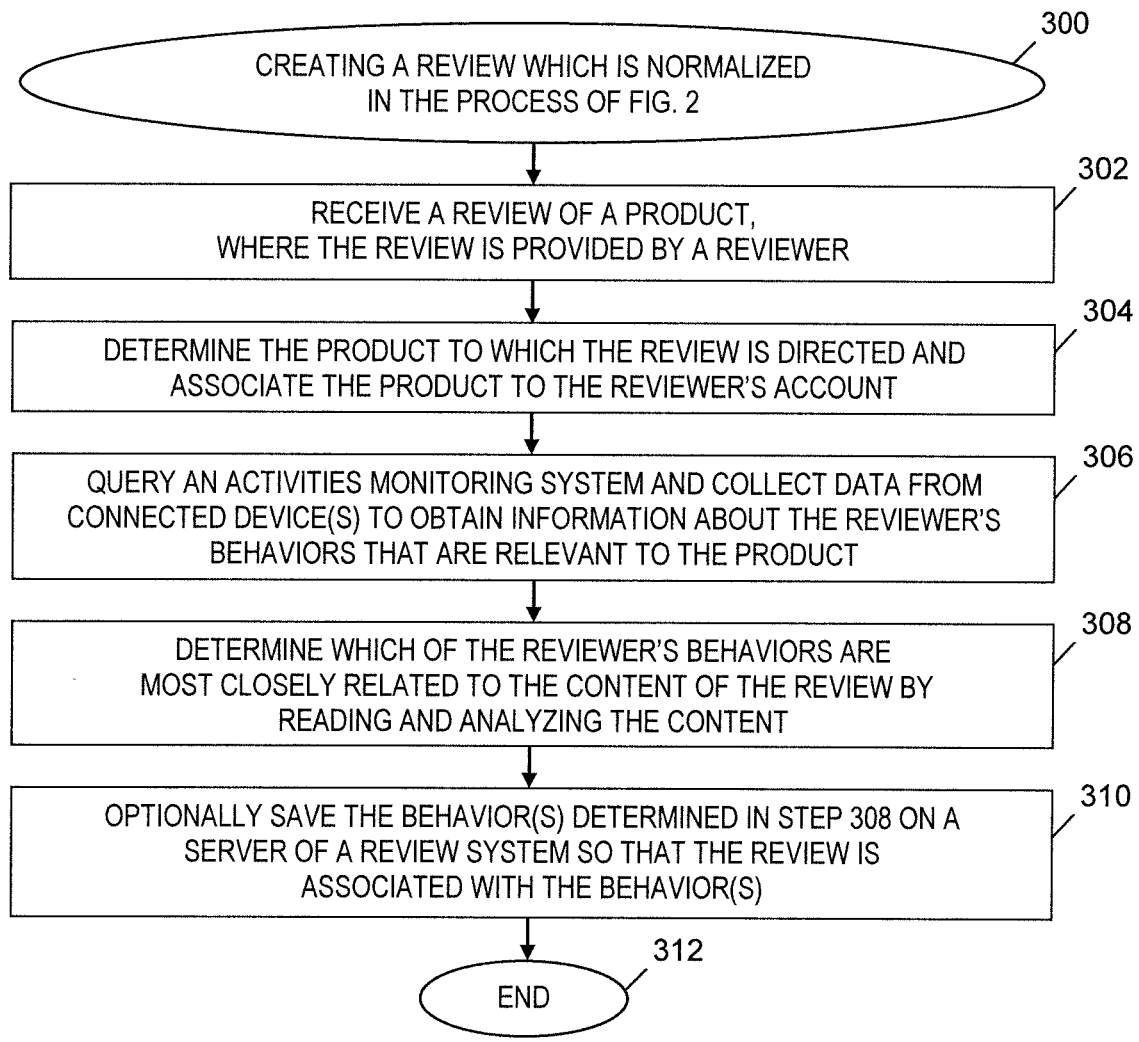
FIG. 3 is a flowchart of a process of creating a review which is normalized in the process of FIG. 2, in accordance with embodiments of the present invention.

FIG. 3 is a flowchart of a process of creating a review which is normalized in the process of FIG. 2, in accordance with embodiments of the present invention. The process of FIG. 3 begins at step 300. In step 302, review management system 104 (see FIG. 1) receives review 106-1 (see FIG. 1), where the review is provided by a reviewer.

In step 304, review management system 104 (see FIG. 1) determines the particular product to which the review is directed (e.g., by using text analysis techniques) and associates the product with an account the reviewer.

In step 306, review management system 104 (see FIG. 1) queries an activities monitoring system and via the query, collects data from connected device(s) to obtain information about the reviewer's behaviors or activities that are relevant to the product.

In step 308, review management system 104 (see FIG. 1) determines one or more of the aforementioned behaviors or activities of the reviewer are most closely related to the content of review 106-1 (see FIG. 1) by reading and performing a text analysis of the content.

In step 310, review management system 104 (see FIG. 1) saves the one or more behaviors or activities determined in step 308 on a server so that the one or more behaviors or activities are associated with the review, and the retrieval of data in step 206 (see FIG. 2) utilizes the association between the one or more behaviors or activities and the review.

Alternately, step 310 is not performed and review management system 104 (see FIG. 1) queries the activities monitoring system as needed during step 206 (see FIG. 2).

The process of FIG. 3 ends at step 312.

Process of Modifying a Review Based on Connected Device Data

Figure 4:
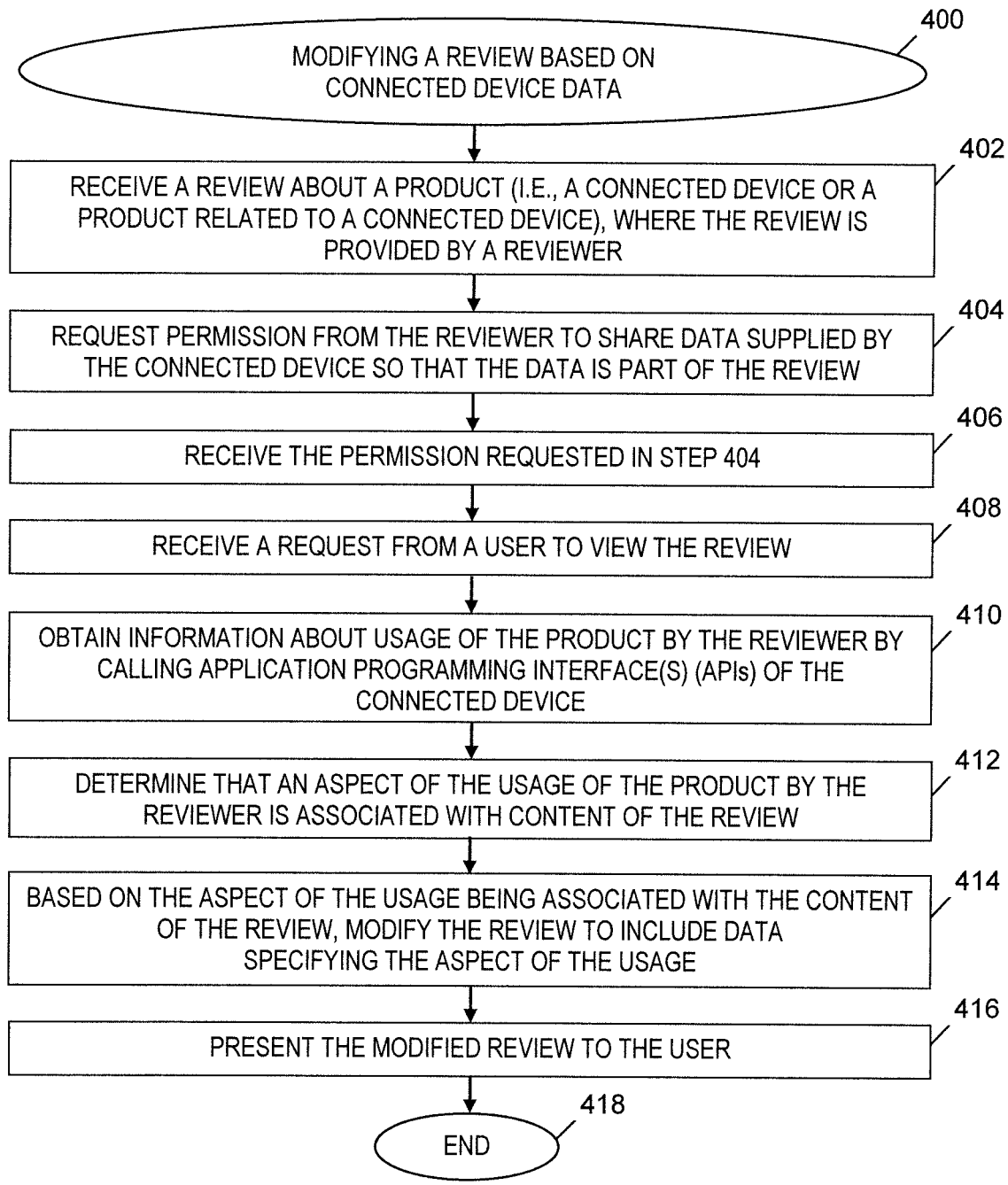
FIG. 4 is a flowchart of a process of modifying a review based on connected device data, where the process is implemented by the system of FIG. 1, in accordance with embodiments of the present invention.

FIG. 4 is a flowchart of a process of modifying a review based on connected device data, where the process is implemented by the system of FIG. 1, in accordance with embodiments of the present invention. The process of FIG. 4 begins at step 400. In step 402, review management system 104 (see FIG. 1) receives a review of a product which is a connected device or includes or is otherwise related to a connected device. The review is provided by a reviewer who has purchased the product.

In step 404, review management system 104 (see FIG. 1) requests permission from the reviewer to share data supplied by the connected device so that the data becomes part of the review. In one embodiment, the sharing of the data is performed by oAuth flow granting READ access to the data. For example, a fitness tracker device may share information about food and water intake, weight, heart rate, sleep, and exercise.

In step 406, review management system 104 (see FIG. 1) receives the permission requested in step 404 and posts the review.

In step 408, review management system 104 (see FIG. 1) receives a request from a user to view the review, where the user is different from the reviewer.

In step 410, review management system 104 (see FIG. 1) obtains information about usage of the product by the reviewer by calling APIs of the connected device. In one embodiment, the information obtained in step 410 includes amount of time that the product was used and specific data from sensors about the reviewer's activities (e.g., steps taken, calories burnt, miles walked, stairs climbed, hours slept, etc.).

In step 412, review management system 104 (see FIG. 1) determines that an aspect of the usage of the product by the reviewer is associated with the content of the review.

In step 414, based on the aspect of the usage being associated with the content of the review, review management system 104 (see FIG. 1) modifies the review, which generates review 114 (see FIG. 1), which includes data specifying the aspect of the usage, where the data is or is derived from the information obtained in step 410. If the reviewer has used the product, then in step 414, the review is modified to include an indicator that the reviewer is a verified user.

In one embodiment, the modified review 114 (see FIG. 1) includes a combination of: (1) an indication of how frequently the reviewer uses the product (e.g., frequent user, light user, etc.)., (2) specific sensor readings (e.g., average usage of the product since the reviewer purchased the product, usage of the product over a specified period of time such as the last day, week or month, usage of the product since the review was posted, or usage of the product up to the time the review was posted), (3) whether the reviewer discontinued usage of the product and when the reviewer stopped using the product (e.g., Reviewer 1 has not used this product in over a month), and (4) discrepancies in the content of the review and the actual usage (e.g., Reviewer 1's review states that Reviewer 1 cannot live without his device, but the sensor data indicates that Reviewer 1 uses the device only once a month which is classified as infrequent).

In step 416, review management system 104 (see FIG. 1) presents the modified review 114 (see FIG. 1) to the user.

Because the user sees from the modified review 114 (see FIG. 1) that the reviewer is a verified user of the product (and not merely a purchaser who does not use the product), the user trusts the review more than other reviews of the same product that were not authored by verified users.

The process of FIG. 4 ends at step 418.

EXAMPLES

FIG. 5 is an example of saving reviewer activity information in association with a review created by the process of FIG. 3, in accordance with embodiments of the present invention. In step 502, review management system 104 (see FIG. 1) receives Pat's review of a refrigerator XYZ owned by Pat. Step 502 is included in step 302 (see FIG. 3).

In step 504, review management system 104 (see FIG. 1) queries a monitoring system to collect all available information about Pat's activities related to the refrigerator XYZ. Step 504 is included in step 306 (see FIG. 3). The collected information includes how often refrigerator XYZ is used by Pat, how hard Pat closes the door of refrigerator XYZ, how often Pat uses the water dispenser of refrigerator XYZ, and the temperature of the refrigerator XYZ as selected by Pat, and how often Pat opens and closes the door of refrigerator XYZ.

In step 506, review management system 104 (see FIG. 1) analyzes content of Pat's review to determine that Pat is complaining that the door of refrigerator XYZ is flimsy. Step 506 is included in step 308 (see FIG. 3).

In step 508, review management system 104 (see FIG. 1) determines which of the collected information about Pat's activities is related to the door of refrigerator XYZ being flimsy. The collected information determined to be related to the door being flimsy includes information indicating how often Pat opens and closes the door and how hard Pat closes the door. Step 508 is included in step 308 (see FIG. 3).

In step 510, review management system 104 (see FIG. 1) saves the information determined in step 508 in association with the review. Step 510 is included in step 310.

FIG. 6 is an example of normalizing reviews using the process of FIG. 2, in accordance with embodiments of the present invention. In step 602, review management system 104 (see FIG. 1) receives a request from a viewer to view reviews about refrigerator XYZ. Step 602 is included in step 202 (see FIG. 2).

In step 604, review management system 104 (see FIG. 1) determines that the identity of the viewer is Joe. Step 604 is included in step 204 (see FIG. 2).

In step 606, review management system 104 (see FIG. 1) queries an activities monitoring system to determine Joe's activities related to Joe's own refrigerator ABC, including Joe's pattern of behavior of closing the door of Joe's refrigerator ABC hard (i.e., with a force that exceeds a predetermined threshold force). Step 606 is included in step 206 (see FIG. 2).

In step 608, review management system 104 (see FIG. 1) identifies topics related to Joe's pattern of behavior of closing the door of refrigerator ABC hard, which includes identifying topics about a door of a refrigerator. Step 608 is included in step 208 (see FIG. 2).

In step 610, review management system 104 (see FIG. 1) performs a lookup of saved reviews to determine reviews that include the identified topics, including Pat's review received in step 502 (see FIG. 5). Step 610 is included in step 210 (see FIG. 2).

In step 612, review management system 104 (see FIG. 1) presents the requested reviews to Joe by presenting the reviews resulting from the lookup in step 610 and filtering out other reviews that do not include the topics identified in step 608.

FIG. 7 is an example of a review 700 modified by the process of FIG. 4, in accordance with embodiments of the present invention. Chris Smith writes a review about Fitness Tracker XYZ (i.e., a fitness tracker device), where the review includes content 702. Chris Smith provides permission for review management system 104 (see FIG. 1) to obtain information about the usage of Fitness Tracker XYZ by Chris Smith. Mary requests a view of reviews of Fitness Tracker XYZ. In response to Mary's request, review management system 104 (see FIG. 1) calls APIs of Chris Smith's Fitness Tracker XYZ to obtain information about the actual usage of Fitness Tracker XYZ by Chris Smith. Review management system 104 (see FIG. 1) obtains actual usage information including the information that Chris Smith records an average of 10,000 steps a day using Fitness Tracker XYZ. Based on the actual usage information obtained, review management system 104 (see FIG. 1) modifies the review written by Chris Smith to include (1) an indicator 704 that Chris Smith is a verified user of Fitness Tracker XYZ and (2) actual usage information 706 that indicates the Chris Smith records an average of 10,000 steps a day. The indicator 704 is different from indicating the Chris Smith is a purchaser of Fitness Tracker XYZ because a purchaser of a product may not use the product or may have stopped using the product.

Computer System

Figure 8:
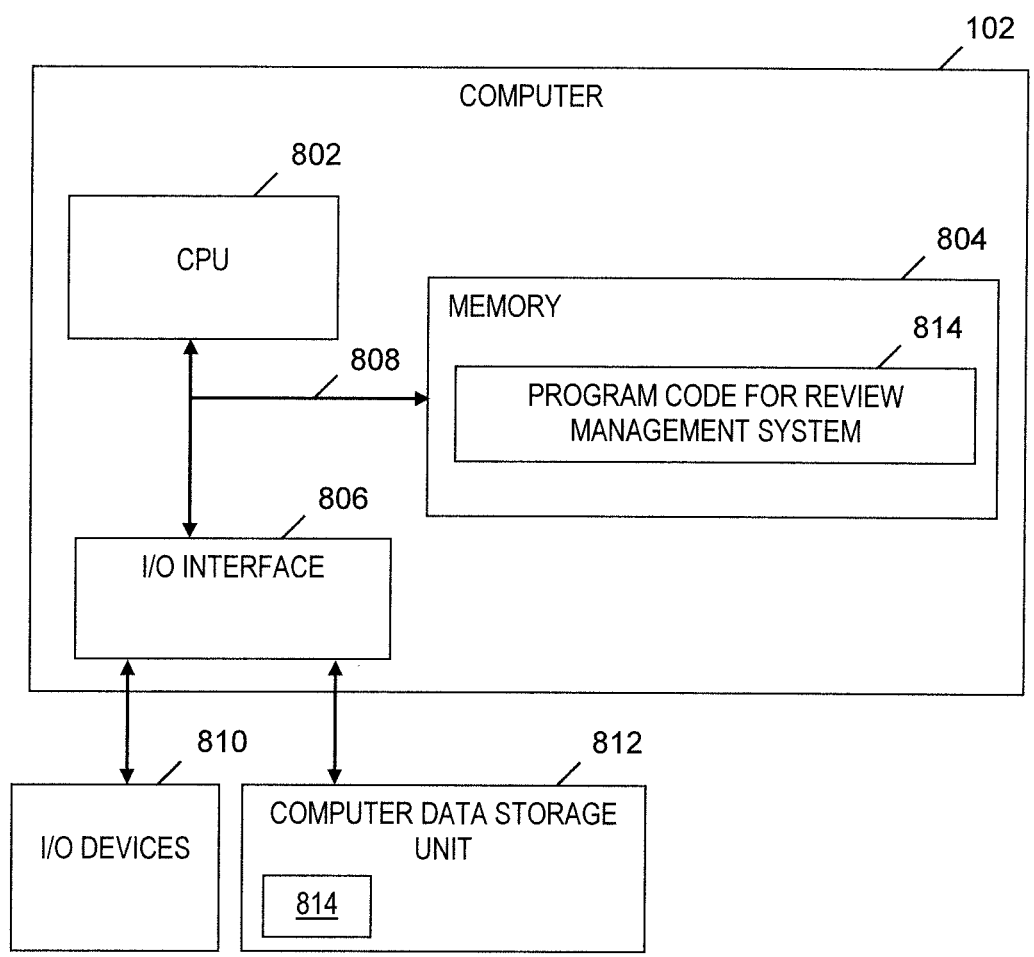
FIG. 8 is a block diagram of a computer that is included in the system of FIG. 1 and that implements the processes of FIG. 2, FIG. 3, and FIG. 4, in accordance with embodiments of the present invention.

FIG. 8 is a block diagram of a computer 102 that is included in the system of FIG. 1 and that implements the processes of FIG. 2, FIG. 3, and FIG. 4, in accordance with embodiments of the present invention. Computer 102 is a computer system that generally includes a central processing unit (CPU) 802, a memory 804, an input/output (I/O) interface 806, and a bus 808. Further, computer 102 is coupled to I/O devices 810 and a computer data storage unit 812. CPU 802 performs computation and control functions of computer 102, including executing instructions included in program code 814 to perform a method of normalizing reviews, where the instructions are executed by CPU 802 via memory 804. CPU 802 may include a single processing unit, or be distributed across one or more processing units in one or more locations (e.g., on a client and server).

Memory 804 includes a known computer readable storage medium, which is described below. In one embodiment, cache memory elements of memory 804 provide temporary storage of at least some program code (e.g., program code 814) in order to reduce the number of times code must be retrieved from bulk storage while instructions of the program code are executed. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display, keyboard, etc. Bus 808 provides a communication link between each of the components in computer 102, and may include any type of transmission link, including electrical, optical, wireless, etc.

I/O interface 806 also allows computer 102 to store information (e.g., data or program instructions such as program code 814) on and retrieve the information from computer data storage unit 812 or another computer data storage unit (not shown). Computer data storage unit 812 includes a known computer-readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are executed by CPU 802 via memory 804 to normalize reviews. Although FIG. 8 depicts memory 804 as including program code, the present invention contemplates embodiments in which memory 804 does not include all of code 814 simultaneously, but instead at one time includes only a portion of code 814.

Further, memory 804 may include an operating system (not shown) and may include other systems not shown in FIG. 8.

Storage unit 812 and/or one or more other computer data storage units (not shown) that are coupled to computer 102 may store reviews 106-1, . . . , 106-N (see FIG. 1) and information collected from sensor(s) 108-1, . . . , 108-N (see FIG. 1) and sensor(s) 110 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to normalizing reviews. Thus, an embodiment of the present invention discloses a process for supporting computer infrastructure, where the process includes providing at least one support service for at least one of integrating, hosting, maintaining and deploying computer-readable code (e.g., program code 814) in a computer system (e.g., computer 102) including one or more processors (e.g., CPU 802), wherein the processor(s) carry out instructions contained in the code causing the computer system to normalize reviews. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of normalizing reviews.

While it is understood that program code 814 for normalizing reviews may be deployed by manually loading directly in client, server and proxy computers (not shown) via loading a computer-readable storage medium (e.g., computer data storage unit 812), program code 814 may also be automatically or semi-automatically deployed into computer 102 by sending program code 814 to a central server or a group of central servers. Program code 814 is then downloaded into client computers (e.g., computer 102) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of normalizing reviews. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 804 and computer data storage unit 812) having computer readable program instructions 814 thereon for causing a processor (e.g., CPU 802) to carry out aspects of the present invention.

The computer readable storage medium can be a tangible device that can retain and store instructions (e.g., program code 814) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 814) described herein can be downloaded to respective computing/processing devices (e.g., computer 102) from a computer readable storage medium or to an external computer or external storage device (e.g., computer data storage unit 812) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 814) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 8) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 814).

These computer readable program instructions may be provided to a processor (e.g., CPU 802) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 812) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 814) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of normalizing reviews, the method comprising the steps of:
   a computer receiving a request from a user for a view of reviews of a first product, the reviews provided by respective reviewers, and the user being different from each of the reviewers;
   the computer receiving data specifying a behavior of the user from one or more sensors that monitor one or more activities of the user, the behavior describing a usage by the user of a second product;
   the computer receiving data specifying a usage of the first product by the reviewers from other sensors that monitor activities of the reviewers;
   based on the data specifying the behavior of the user and the data specifying the usage of the first product by the reviewers, the computer identifying topics specifying an aspect of the first product which matches an aspect of the second product to which the behavior of the user is directed;
   based on the identified topics, the computer normalizing the reviews of the first product by (i) determining a subset of the reviews of the first product that include at least one of the identified topics and (ii) selecting the subset of the reviews so that at least one of the reviews of the first product that does not include at least one of the identified topics remains unselected;
   the computer presenting the selected subset of the reviews to the user in the requested view so that the selected subset of the reviews is distinguished from the unselected at least one review;
   the computer presenting the unselected at least one review which includes a visual indicator that indicates that the unselected at least one review is not related to the identified topics;
   the computer presenting to the user an overall rating of the first product based on ratings associated with the selected subset of the reviews but not based on ratings associated with the unselected at least one review;

the computer receiving a review about the first product, the review being provided by a reviewer;

the computer determining that the first product is a connected device configured to supply data about usage of the connected device;

responsive to the step of determining that the first product is the connected device, the computer prompting the reviewer for permission to share the data supplied by the connected device as part of the review and the computer receiving the permission;

the computer receiving a request from the user to view the review;

responsive to the step of receiving the request to view the review, the computer calling application programming interfaces (APIs) of the connected device;

responsive to the step of calling the APIs of the connected device, the connected device sending information about usage of the connected device by the reviewer, the information including an amount of time the connected device was used by the reviewer;

responsive to the step of sending the information about the usage of the connected device by the reviewer, the computer obtaining information about the usage of the connected device;

based on the information about the usage of the connected device by the reviewer, the computer determining that an aspect of the usage of the connected device by the reviewer is associated with content of the review; and based on the aspect of the usage of the connected device by the reviewer being associated with the content of the review, the computer modifying the review so that the modified review includes (i) an indication of how frequently the reviewer uses the connected device, (ii) a usage of the connected device up to a time at which the review was posted, (iii) whether the reviewer discontinued usage of the connected device, and (iv) an indicator that the reviewer is a verified user of the connected device; and the computer presenting to the user the modified review so that the modified review having the indicator that the reviewer is the verified user of the connected device is more trustworthy to the user than other reviews that do not include respective indicators that other reviewers are verified users of the connected device, the other reviews being reviews of the connected device by the other reviewers, respectively.

2. The method of claim 1, further comprising the steps of:

the computer receiving and saving a first review provided by a first reviewer;

the computer determining that the first review includes content that describes the first product;

based on the first review including the content that describes the first product, the computer associating the first product to an account of the first reviewer;

the computer sending a query to a monitoring system for data from the other sensors about behaviors of the first reviewer related to the first product;

the computer receiving from the other sensors the data about the behaviors of the first reviewer related to the first product;

the computer determining that one or more behaviors included in the behaviors of the first reviewer are related to the content of the first review;

the computer selecting the first review as a member of the subset of the reviews based on the one or more behaviors being directed to the aspect of the first product which matches the aspect of the second product to which the behavior of the user is directed; and the computer presenting the first review to the user in the requested view so that the first review is distinguished from at least one other review included in the reviews that is not included in the subset.

3. The method of claim 1, further comprising the steps of:

the computer determining that the user has purchased the first product; and based on the user having purchased the first product, the computer sending a message to the user indicating a comparison of a usage of the first product by the user and usage of the first product by one or more reviewers included in the reviewers.

4. The method of claim 1, further comprising the step of:

providing at least one support service for at least one of creating, integrating, hosting, maintaining, and deploying computer readable program code in the computer, the program code being executed by a processor of the computer to implement the steps of receiving the request for the view of the reviews, receiving the data specifying the behavior of the user, receiving the data specifying the usage of the first product, identifying the topics, normalizing the reviews, presenting the selected subset of the reviews, presenting the unselected at least one review as including the visual indicator, presenting the overall rating of the first product, receiving the review about the first product, determining that the first product is the connected device, prompting the reviewer for the permission to share the data supplied by the connected device as part of the review, receiving the permission, receiving the request from the user to view the review, calling the APIs of the connected device, obtaining the information about the usage of the connected device, determining that the aspect of the usage of the connected device is associated with the content of the review, modifying the review, and presenting to the user the modified review.

5. A computer program product, comprising:

a computer readable storage medium and a computer readable program code stored in the computer readable storage medium, the computer readable program code containing instructions that are executed by a central processing unit (CPU) of a computer system to implement a method of normalizing reviews, the method comprising the steps of:

the computer system receiving a request from a user for a view of reviews of a first product, the reviews provided by respective reviewers, and the user being different from each of the reviewers;

the computer system receiving data specifying a behavior of the user from one or more sensors that monitor one or more activities of the user, the behavior describing a usage by the user of a second product;

the computer system receiving data specifying a usage of the first product by the reviewers from other sensors that monitor activities of the reviewers;

based on the data specifying the behavior of the user and the data specifying the usage of the first product by the reviewers, the computer system identifying topics specifying an aspect of the first product which matches an aspect of the second product to which the behavior of the user is directed;

based on the identified topics, the computer system normalizing the reviews of the first product by (i) determining a subset of the reviews of the first product that include at least one of the identified topics and (ii) selecting the subset of the reviews so that at least one of the reviews of the first product that does not include at least one of the identified topics remains unselected;

the computer system presenting the selected subset of the reviews to the user in the requested view so that the selected subset of the reviews is distinguished from the unselected at least one review;

the computer system presenting the unselected at least one review as including a visual indicator that indicates that the unselected at least one review is not related to the identified topics;

the computer system presenting to the user an overall rating of the first product based on ratings associated with the selected subset of the reviews but not based on ratings associated with the unselected at least one review;

the computer system receiving a review about the first product, the review being provided by a reviewer;

the computer system determining that the first product is a connected device configured to supply data about usage of the connected device;

responsive to the step of determining that the first product is the connected device, the computer system prompting the reviewer for permission to share the data supplied by the connected device as part of the review and the computer system receiving the permission;

the computer system receiving a request from the user to view the review;

responsive to the step of receiving the request to view the review, the computer system calling application programming interfaces (APIs) of the connected device;

responsive to the step of calling the APIs of the connected device, the connected device sending information about usage of the connected device by the reviewer, the information including an amount of time the connected device was used by the reviewer;

responsive to the step of sending the information about the usage of the connected device by the reviewer, the computer system obtaining information about the usage of the connected device;

based on the information about the usage of the connected device by the reviewer, the computer system determining that an aspect of the usage of the connected device by the reviewer is associated with content of the review; and based on the aspect of the usage of the connected device by the reviewer being associated with the content of the review, the computer system modifying the review so that the modified review includes (i) an indication of how frequently the reviewer uses the connected device, (ii) a usage of the connected device up to a time at which the review was posted, (iii) whether the reviewer discontinued usage of the connected device, and (iv) an indicator that the reviewer is a verified user of the connected device; and the computer system presenting to the user the modified review so that the modified review having the indicator that the reviewer is the verified user of the connected device is more trustworthy to the user than other reviews that do not include respective indicators that other reviewers are verified users of the connected device, the other reviews being reviews of the connected device by the other reviewers, respectively.

6. The computer program product of claim 5, wherein the method further comprises the steps of:

the computer system receiving and saving a first review provided by a first reviewer;

the computer system determining that the first review includes content that describes the first product;

based on the first review including the content that describes the first product, the computer system associating the first product to an account of the first reviewer;

the computer system sending a query to a monitoring system for data from the other sensors about behaviors of the first reviewer related to the first product;

the computer system receiving from the other sensors the data about the behaviors of the first reviewer related to the first product;

the computer system determining that one or more behaviors included in the behaviors of the first reviewer are related to the content of the first review;

the computer system selecting the first review as a member of the subset of the reviews based on the one or more behaviors being directed to the aspect of the first product which matches the aspect of the second product to which the behavior of the user is directed; and the computer system presenting the first review to the user in the requested view so that the first review is distinguished from at least one other review included in the reviews that is not included in the subset.

7. A computer system comprising:
a central processing unit (CPU);
a memory coupled to the CPU; and
a computer readable storage medium coupled to the CPU, the computer readable storage medium containing instructions that are executed by the CPU via the memory to implement a method of normalizing reviews, the method comprising the steps of:

the computer system receiving a request from a user for a view of reviews of a first product, the reviews provided by respective reviewers, and the user being different from each of the reviewers;

the computer system receiving data specifying a behavior of the user from one or more sensors that monitor one or more activities of the user, the behavior describing a usage by the user of a second product;

the computer system receiving data specifying a usage of the first product by the reviewers from other sensors that monitor activities of the reviewers;

based on the data specifying the behavior of the user and the data specifying the usage of the first product by the reviewers, the computer system identifying topics specifying an aspect of the first product which matches an aspect of the second product to which the behavior of the user is directed;

based on the identified topics, the computer system normalizing the reviews of the first product by (i) determining a subset of the reviews of the first product that include at least one of the identified topics and (ii) selecting the subset of the reviews so that at least one of the reviews of the first product that does not include at least one of the identified topics remains unselected;

the computer system presenting the selected subset of the reviews to the user in the requested view so that the selected subset of the reviews is distinguished from the unselected at least one review;

the computer system presenting the unselected at least one review as including a visual indicator that indicates that the unselected at least one review is not related to the identified topics;

the computer system presenting to the user an overall rating of the first product based on ratings associated with the selected subset of the reviews but not based on ratings associated with the unselected at least one review;

the computer system receiving a review about the first product, the review being provided by a reviewer;

the computer system determining that the first product is a connected device configured to supply data about usage of the connected device;

responsive to the step of determining that the first product is the connected device, the computer system prompting the reviewer for permission to share the data supplied by the connected device as part of the review and the computer system receiving the permission;

the computer system receiving a request from the user to view the review;

responsive to the step of receiving the request to view the review, the computer system calling application programming interfaces (APIs) of the connected device;

responsive to the step of calling the APIs of the connected device, the connected device sending information about usage of the connected device by the reviewer, the information including an amount of time the connected device was used by the reviewer;

responsive to the step of sending the information about the usage of the connected device by the reviewer, the computer system obtaining information about the usage of the connected device;

based on the information about the usage of the connected device by the reviewer, the computer system determining that an aspect of the usage of the connected device by the reviewer is associated with content of the review; and based on the aspect of the usage of the connected device by the reviewer being associated with the content of the review, the computer system modifying the review so that the modified review includes (i) an indication of how frequently the reviewer uses the connected device, (ii) a usage of the connected device up to a time at which the review was posted, (iii) whether the reviewer discontinued usage of the connected device, and (iv) an indicator that the reviewer is a verified user of the connected device; and the computer system presenting to the user the modified review so that the modified review having the indicator that the reviewer is the verified user of the connected device is more trustworthy to the user than other reviews that do not include respective indicators that other reviewers are verified users of the connected device, the other reviews being reviews of the connected device by the other reviewers, respectively.

8. The computer system of claim 7, wherein the method further comprises the steps of:

the computer system receiving and saving a first review provided by a first reviewer;

the computer system determining that the first review includes content that describes the first product;

based on the first review including the content that describes the first product, the computer system associating the first product to an account of the first reviewer;

the computer system sending a query to a monitoring system for data from the other sensors about behaviors of the first reviewer related to the first product;

the computer system receiving from the other sensors the data about the behaviors of the first reviewer related to the first product;

the computer system determining that one or more behaviors included in the behaviors of the first reviewer are related to the content of the first review;

the computer system selecting the first review as a member of the subset of the reviews based on the one or more behaviors being directed to the aspect of the first product which matches the aspect of the second product to which the behavior of the user is directed; and the computer system presenting the first review to the user in the requested view so that the first review is distinguished from at least one other review included in the reviews that is not included in the subset.

* * * * *